United States Patent
Hill et al.

(10) Patent No.: US 11,348,597 B2
(45) Date of Patent: May 31, 2022

(54) INTENT-BASED NETWORK VALIDATION

(71) Applicant: Oracle International Corporation, Redwood Shores, CA (US)

(72) Inventors: Peter J. Hill, Seattle, WA (US); Jagwinder Brar, Bellevue, WA (US); Yogesh Sreenivasan, Bothell, WA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 16/691,389

(22) Filed: Nov. 21, 2019

(65) Prior Publication Data
US 2021/0158835 A1    May 27, 2021

(51) Int. Cl.
| | |
|---|---|
| *G10L 15/00* | (2013.01) |
| *G10L 21/10* | (2013.01) |
| *G10L 15/18* | (2013.01) |
| *H04L 41/22* | (2022.01) |
| *H04L 41/0806* | (2022.01) |
| *G10L 15/26* | (2006.01) |

(52) U.S. Cl.
CPC ............ *G10L 21/10* (2013.01); *G10L 15/005* (2013.01); *G10L 15/1815* (2013.01); *G10L 15/1822* (2013.01); *G10L 15/26* (2013.01); *H04L 41/0806* (2013.01); *H04L 41/22* (2013.01)

(58) Field of Classification Search
CPC ....... G10L 15/22; G06F 40/205; G06F 40/211
See application file for complete search history.

(56) References Cited

U.S. PATENT DOCUMENTS

| | | | |
|---|---|---|---|
| 8,238,256 B2 | 8/2012 | Nugent | |
| 9,692,653 B1 | 6/2017 | Basel | |
| 10,069,760 B2 | 9/2018 | Holmes | |
| 10,089,070 B1* | 10/2018 | Kanjariya | ............... G06F 3/167 |
| 10,261,810 B2 | 4/2019 | McCourtney | |

(Continued)

OTHER PUBLICATIONS

CloudMPL: A Domain Specific Language For Desribing Management Policies For An Automatic Cloud Infrastructure https://www.researchgate.net/Publication/292991732_CloudMPL_A_Domain_Specific_Language_For_Describing_Management_Policies_For_An_Automatic_Cloud_Infrastructure.

(Continued)

*Primary Examiner* — Daniel Abebe
(74) *Attorney, Agent, or Firm* — Trellis IP Law Group, PC

(57) ABSTRACT

A network validation system is described which may perform operations such as generating, analyzing, verifying, correcting, recommending, and deploying language, symbols, etc., such as domain specific language, configured to allow users to express their intent on the configuration and operation of a network, such as a cloud-based network. The network validation system may provide domain specific language that includes rules, statements, symbols, data, etc., configured to convey the intent of users on the configuration and operation of networks for purposes such as configuring and/or validating communication paths, testing or setting associated network object configurations, and may be employed to report violations in such configurations relative to user intent of the one or more users. The network validation system may also be employed to monitor such domain specific language and generate telemetry signaling, for example, that a rule has or has not been violated, actions a user may take, etc.

14 Claims, 7 Drawing Sheets

(56) References Cited

U.S. PATENT DOCUMENTS

| | | | |
|---|---|---|---|
| 2008/0288259 A1* | 11/2008 | Chambers | G10L 15/22 |
| | | | 704/275 |
| 2014/0059417 A1* | 2/2014 | Bernelas | G06F 40/169 |
| | | | 715/230 |
| 2018/0276060 A1 | 9/2018 | Arumugam | |
| 2019/0050213 A1* | 2/2019 | Schanafelt | G06F 8/31 |
| 2019/0236130 A1* | 8/2019 | Li | G06N 3/0427 |

OTHER PUBLICATIONS

Domain-Specific Language for Event-based Compliance Monitoring in Process-driven SOAs http://citeseerx.ist.psu.edu/newdoc/download?doi=10.1.1.587.2853&rep=rep1&type=pdf.

Neptune A Domain Specific Language for Deploying HPC Software on Cloud Platforms https://www.nersc.gov/assets/StaffPublications/2011/ioperformance.pdf.

Towards a Domain-Specific Language to Deploy Applications in the Clouds https://www.researchgate.net/publication/325755065_Towards_a_Domain-Specific_Language_to_Deploy_Applications_in_the_Clouds.

A Domain Specific Language for Enterprise Grade Cloud-Mobile Hybrid Applications http://dsmforum.org/events/DSM11/Papers/ranabahu.pdf.

* cited by examiner

Example statements to define non cloud resources:

Define ChicagoOnPremise as an external network with a CIDR of 10.20.0.0/16

Define NewYorkOnPremise as an external network with a CIDR of 10.40.0.0/16

Define OnPremiseNetworks as the union of ChicagoOnPremise and NewYorkOnPremise

Example statements to provide alternative names to cloud resources:

Define MyProductionCloud as a cloud network with an ID of XYZRANDOMUUID

Define MyCloudDatabases as cloud hostclass with an ID of ANOTHERUUID

Define MyCloudWebPortal as cloud load balancer with an ID of LBUUID

Example rules to define intent on connectivity and security policy:

Rule A: The OnPremiseNetworks hosts can connect via tcp to MyCloudWebPortal on ports 80 and 443

Rule B: The NewYorkOnPremise hosts can connect via tcp to MyCloudDatabases on ports 22 and 1151

Rule C: The Internet can connect via tcp to MyCloudWebPortal on ports 80 and 443

Rule D: The Internet cannot connect to MyCloudDatabases

Rule E: The ChicagoOnPremise cannot connect to MyCloudDatabases

Rule F: There should be at least 2 paths between each OnPremiseNetworks and MyProductionCloud

FIG. 3A

Example rules to define intent on connectivity and security policy:

Rule A: The OnPremiseNetworks hosts can connect via tcp to MyCloudWebPortal on ports 80 and 443

- My cloud web portal hosts a VIP that listens on port 80 and port 443
- The security lists on the VIP allow traffic from 10.20.0.0/16 and 10.40.0.0/16
- The IP for the OnPremiseNetworks is reachable via private IP Connectivity or IPSec from the MyCloudWebPortal
- The MyCloudWebPortal VIP is advertised to the OnPremiseNetworks either via private IP Connectivity or IPSec

Rule B: The NewYorkOnPremise hosts can connect via tcp to MyCloudDatabases on ports 22 and 1151

- MyCloudDatabases listens on port 22 and port 1151
- The security lists on the MyCloudDatabases IP allow traffic from and 10.40.0.0/16
- The IP for NewYorkOnPremise is reachable via private IP Connectivity or IPSec from the MyCloudDatabases
- The MyCloudDatabases IP is advertised to the OnPremiseNetworks either via private IP Connectivity or IPSec

Rule C: The Internet can connect via tcp to MyCloudWebPortal on ports 80 and 443

- Security Lists allow traffic from the Internet to the MyCloudWebPortal IPs on ports 80 and 443
- There is a public IP on MyCloudWebPortal that is advertised to the Internet

Rule D: The Internet cannot connect to MyCloudDatabases

- Security Lists prevent traffic from the Internet from reaching MyCloudDatabase

Rule E: The ChicagoOnPremise cannot connect to MyCloudDatabases

- Prevent connection

Rule F: There should be at least 2 paths between each OnPremiseNetworks and MyProductionCloud

- Check for at least two paths between networks

FIG. 3B

INTENT-BASED NETWORK VALIDATION

BACKGROUND

The following relates to network operation and configuration. More particularly, the following is related to establishing and validating network operations and configurations.

One area of network security that is becoming increasingly complex is that of securely routing network communication traffic between data objects and computing devices related to one or more networks. Currently, configuring each network object to reject or allow network traffic usually involves an Information Technology (IT) specialist to configure each network object. Involving an IT specialist in network routing configurations and security is typically an expensive and fragile endeavor, as many networks often have unique requirements that must be addressed and maintained on an ongoing basis in order for the network to continue to work and provide secure communications between data objects and computing devices within and external to the network.

Since preventing security breaches is often of paramount concern to customers and authorized network users, the IT specialist usually must learn and update the unique requirements of the customer to implement network configurations designed to prevent security lapses against an ever increasing sophistication from surreptitious individuals attempting to obtain unauthorized access to the customers network. As such, the complexity and cost of maintaining secure access and proper network communication operation inside and outside the network is becoming increasingly prohibitive.

Therefore, what is needed is a system and method that provides an automated and efficient way to implement, configure, and validate network communications, operations, and user access that overcomes the above limitations.

SUMMARY

In implementations, a network validation system is employed to perform operations such as generating, analyzing, verifying, correcting, recommending, and deploying language, symbols, and phrases configured to allow users to express their intent on the operation of a network, such as a cloud-based network, herein also referred to as a "cloud network." In one implementation, the network validation system provides domain specific language that includes rules and statements configured to reflect the intent of one or more users. The rules and statements may be configured for a plurality of purposes including the purpose to validate associated network object configurations, and to report violations in these configurations relative to the intent of the one or more users.

In one implementation, the network validation system is configured to receive, parse, analyze, and validate domain specific language to determine if the domain specific language contains variances and/or errors that are valid, erroneous, unrecognized, and/or otherwise ignorable within one or more error thresholds. If the network validation system determines that the domain specific language contains variances and/or errors that are valid, unrecognized, and/or otherwise ignorable outside one or more error thresholds, the network validation system may be configured to ignore and/or iteratively correct such variances and errors until they fall within the one more error thresholds.

In other implementations, the network validation system may also provide guidance to the user, for example, on ways to make their network, such as a cloud network, be in compliance with their user intent, provide guidance on remedying a policy violation, and the like. In one example, the network validation system may determine that a user intends that all local network communication be sent through a specific communication port or ports, and provides guidance to the user as to which rules, statements, and the like may be used to accomplish the intent of the user to send all local network communication through such specific port or ports.

In an exemplary implementation, the network validation system may be configured to validate policy statements, rules, and the like, to determine if they are acceptable or not acceptable to meet the intent of a user. For example, the network validation system may analyze a policy statement provided to define the configuration and operation of network and non-network nodes and resources to validate whether the policy statement sufficiently express user intent, does not express sufficient user intent, is invalid, and/or employed for another purpose.

In another implementation, a method and or system, such as the network validation system, may be employed to analyze language, phrases, symbols, images, emojis, and the like, to determine a level or levels of user intent associated with such language, phrases, symbols, images, emojis, and the like, and/or combinations thereof. Moreover, such method and system may be configured to analyze such level or levels of user intent to determine whether such level or levels pass one or more thresholds employed to define such level or levels of user intent.

A further understanding of the nature and the advantages of particular embodiments disclosed herein may be realized by reference of the remaining portions of the specification and the attached drawings.

BRIEF DESCRIPTION OF THE DRAWINGS

FIG. 3A illustrates example statements and rules establishing network configuration and communication policies.

FIG. 3B illustrates example rules establishing defining intent for network connectivity and security.

DETAILED DESCRIPTION

In exemplary implementations, a network validation system may be configured to generate and verify language, such as domain specific language, and the like, employed to convey user intent on the configuration and operation of a network, such as a cloud network. In one implementation, domain specific language containing policy statements, rules, symbols, images, and the like, may be employed to express the user intent on how a network, cloud network, and the like should operate including, for example, defining operation of nodes of the network, defining names of the nodes, establishing connectivity between the nodes, defining security policies, etc. In other implementations, such domain specific language may be employed to analyze associated cloud object configurations and to report violations in these configurations relative to the intent of the user.

In an implementation, the network validation system may analyze the incompatibilities and errors pertaining to language, phrases, symbols, images, emojis, drawings, and the like, to discern which incompatibilities and/or errors fall within one or more tolerance levels. Such one or more tolerance levels may be used, for example, to set one or more operating margins for example, for network components, network resources, etc., associated with one or more cloud networks to tolerate at least some level of such incompatibilities and/or errors while operating relative to the user intent conveyed by the language, phrases, symbols, images, emojis, and the like.

In other implementations, the network validation system may be configured to automatically repair at least some incompatibilities and/or errors. Such automatic repair may be done in an open loop process, or may be done recursively using feedback until the incompatibilities and/or errors fall within one or more thresholds or tolerance levels.

Figure 1:
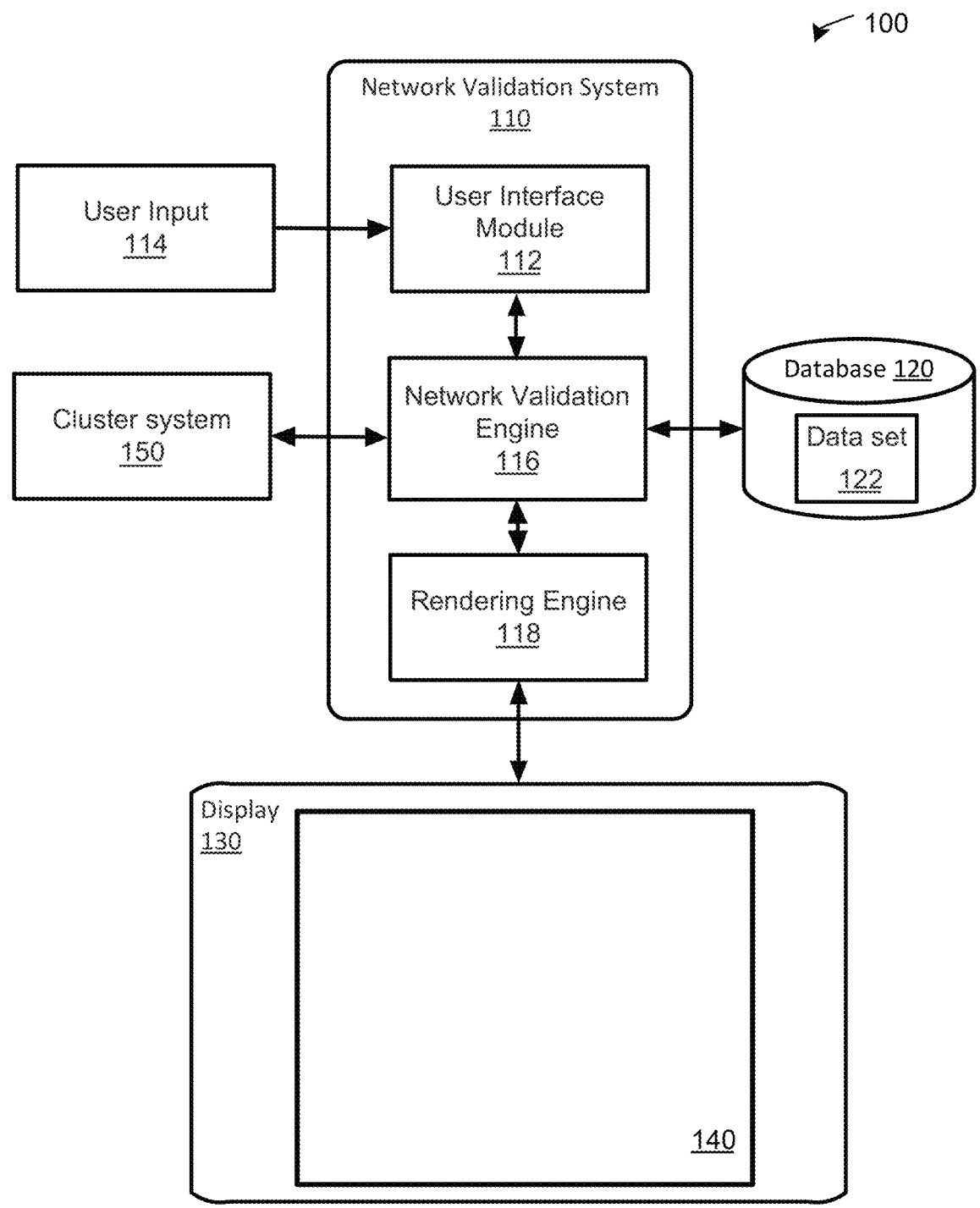
FIG. 1 is a high level illustration of a computing system used for network configuration and validation.

FIG. 1 is a high-level block diagram of an exemplary computing system 100 for implementing and validating network configurations and operations thereof. Computing system 100 may be any computing system, such as an enterprise computing environment, client-server system, and the like. Computing system 100 includes network validation system 110 configured to process data received from a user interface 114, such as a keyboard, mouse, etc., with regard to processes such as parsing, querying, analyzing, probing, data processing, generating, configuring, modeling, labeling, data binding, maintenance, etc., associated with data elements, nodes, network components, information, and the like as described herein.

Note that the computing system 100 presents a particular example implementation, where computer code for implementing embodiments may be implemented, at least in part, on a server. However, embodiments are not limited thereto. For example, a client-side software application may implement network validation system 110, or portions thereof, in accordance with the present teachings without requiring communications between the client-side software application and a server.

In one exemplary implementation, network validation system 110 may be connected to display 130 configured to display data 140, for example, to a user thereof. Display 130 may be a passive and/or an active display, adapted to allow a user to view and interact with graphical data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to configure and validate network settings, network operations, specify network configuration intent, define and validate levels of user intent, initiate queries, resolve data errors and incompatibilities, convert data, model, analyze, simulate, deploy tests, maintain data 140, etc.

In some implementations, computing system 100 may include a data source such as database 120. Database 120 may be connected to network validation system 110 directly or indirectly, for example via a network connection, and may be implemented as a non-transitory data structure stored on a local memory device, such as a hard drive, Solid State Drive (SSD), flash memory, and the like, or may be stored as a part of a cloud network, as further described herein.

Database 120 may contain data sets 122. Data sets 122 may include data as described herein. Data sets 122 may also include data pertaining to network operation, network configuration, node operation, node attributes, querying, monitoring, testing, analyzing, software operation, data models, data structures, data hierarchy, nodal positions, values, value types, summations, visualizations, code (e.g., JSON, JavaScript, PL/SQL, Typescript, XSD, XML, etc.), source, security, hashes, and the like. In addition, data sets 122 may also contain other data, data elements, and information such as metadata, labels, development-time information, run-time information, user configuration information, API, interface component information, library information, tolerance threshold data, error threshold data, simulation data, pointers, and the like.

Network validation system 110 may also include user interface module 112, network validation engine 116, and rendering engine 118. User interface module 112 may be configured to receive and process data signals and information received from user interface 114. For example, user interface module 112 may be adapted to receive and process data from user input associated with data 140 for processing via network validation system 110.

In exemplary implementations, network validation engine 116 may be adapted to receive data from user interface 114 and/or database 120 for processing thereof. In one configuration, network validation engine 116 is a software engine configured to receive and process input data, such as domain specific language, operational data, attributes, configuration data, etc., from a user thereof pertaining to data 140 from user interface module 114 and/or database 120 in order to configure and validate one or more networks based on intent of a user for the operation of the one or more networks relative to one or more operating thresholds, error thresholds, etc. For example, during a network configuration process, network validation engine 116 may analyze incompatibilities and/or errors associated with applying statements and rules configuring network operation relative to user intent to determine whether the incompatibilities and/or errors are within acceptable levels, e.g., acceptable relative to user intent, where some error thresholds may be set for benign errors and/or for other types of user and/or system acceptable errors, thereby providing for an adjustable operational tolerance.

In other implementations, network validation engine 116 may allow for network operation with an acceptable threshold level of errors associated with networks, such as communication errors, security errors, reference errors, software errors, and the like. Network validation engine 116 may also be used to correct and resolve such errors offline or on the fly, with or without warnings given to a user thereof, in an open ended or recursive manner, for example, by using introspective error analysis techniques that may discern errors and software bugs that may be benign or acceptable within a given tolerance level, such as typographical errors, incorrect resource call data, etc. from other types of errors and software bugs that may be considered unacceptable.

Network validation engine 116 in other implementations may be configured as a data analysis tool to perform analysis functions associated with data 140. Such analysis functions may include analyzing language, such as rules and policy statements, to determine user intent toward configuring operation of a network associated with data 140, determine communication between network objects, determining network security, determining data types, determining the values of the data, determining the relationships to other data, interpreting metadata associated with the data, determining error types, tolerance data, and the like.

In some implementations, network validation engine 116 may be configured to receive, parse, and analyze data associated with data sets 122 to determine network configuration and operation based on language, such as domain specific language, spoken language, and the like, containing rules and policy statements allowing and deny communication traffic between network objects in the cloud network and those outside the cloud network, determining how the objects connect to the cloud network, determining what Internet Protocol (IP) objects use in the cloud network, etc. For example, network validation engine 116 may be configured to analyze domain specific language to determine from policy statements or rules the intent of a user to set an out-of-network resource to be identified with a specific Classless Inter-Domain Routing (CIDR) identifier.

In other implementations, network validation engine 116 may be employed to analyze data sets 122 to determine other factors associated with a user's unique working and security network configuration by assessing, for example, communication path (as referred to herein as "paths"), redundancy requirements, preferred paths, backup paths, internet access protocols to and/or from network hosts, and the like.

Network validation engine 116 may also be configured to determine incompatibilities between different versions of the domain specific language, user interaction values, key/value pairs, string identifiers, data properties, types of errors, error tolerance levels, user interface configuration, definitions, data processing instructions, data attributes, data hierarchy, nodes, nodal positions within the hierarchy, values, data type, summations, source code, security, hashes, and the like, associated with data sets 122.

Network validation engine 116 may also receive existing data sets 122 from database 120 for processing thereof. Such data sets 122 may include and represent a composite of separate data sets 122 and data elements pertaining to, for example, domain specific language, organizational data, which may include data such as employment data, salary data, personnel data, and the like. In addition, data sets 122 may include other types of data, data elements, and information such as input/output simulation data, contact data, sales data, production data, scientific data, financial data, medical data, census data, and the like.

Rendering engine 118 may be configured to receive configuration data pertaining to data 140, associated data sets 122, and other data associated with data 140 such as user interface components, icons, user pointing device signals, and the like, used to render data 140 on display 130. In one exemplary implementation, rendering engine 118 may be configured to render 2D and 3D graphical models, simulations, testing processes, etc., to allow a user to obtain more information about data sets 122 associated with data 140. In one implementation, upon receiving instruction from a user, for example, through user interface 114, rendering engine 118 may be configured to generate a real-time display of interactive changes being made to data 140 by a user thereof.

Figure 2:
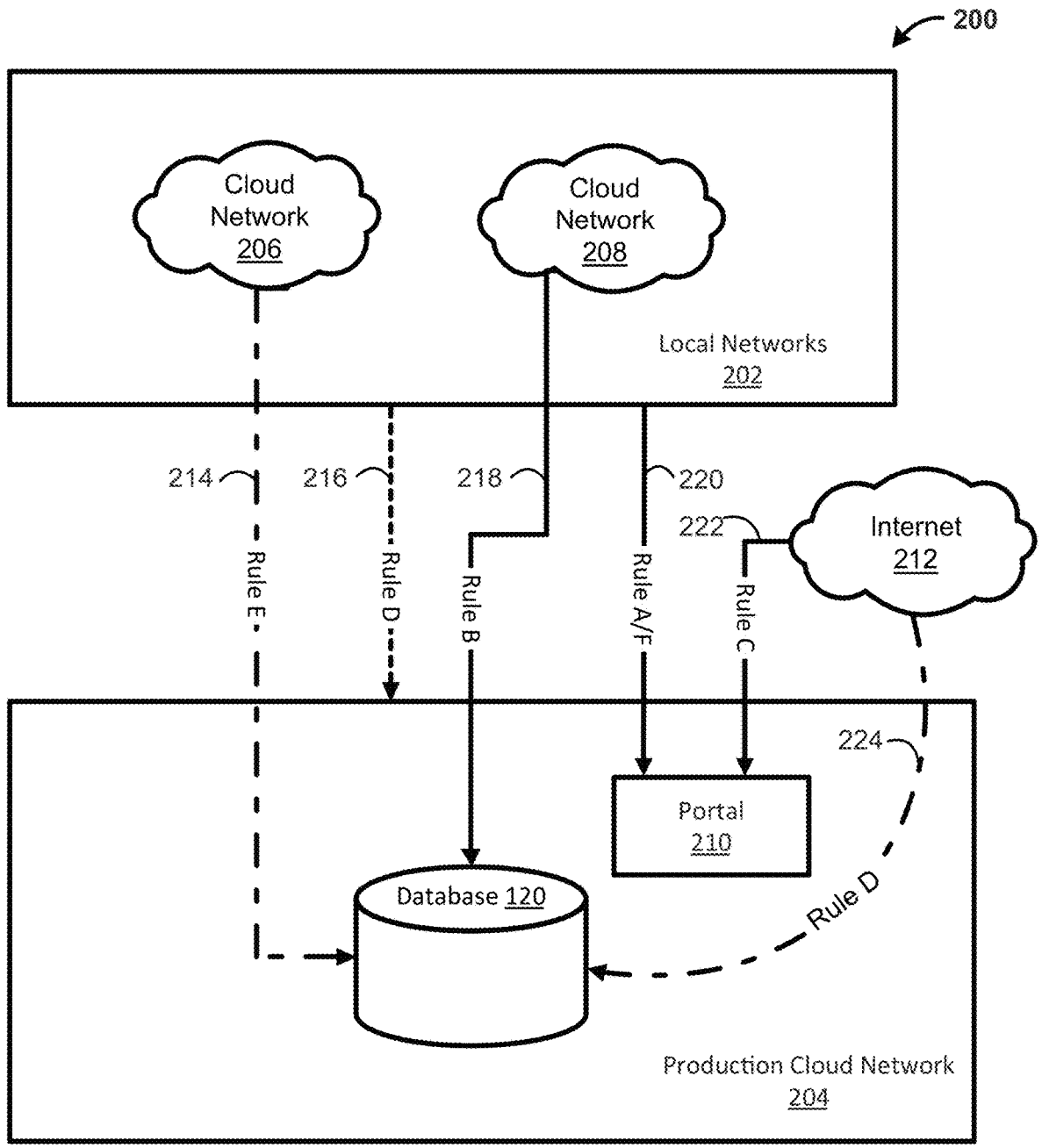
FIG. 2 is a high-level illustration of cloud network resources and associated connection policies.

FIG. 2 is a high-level illustration of connected network resources and configurations defined by associated connection policies and rules. In an example implementation, network 200 includes local networks 202, also referred to herein as an "on premise networks" connected to a production cloud network 204, also referred to herein as a "my production cloud." Local networks 202 may include one or more networks, such as cloud networks. For example, as illustrated, local networks 202 includes cloud network 206 and cloud network 208. In this example, cloud network 206 and cloud network 208 may be networks configurable by a user using configuration statements, rules, etc. such as statements and rules as described herein conveyed in the form of, for example, domain specific language using words, symbols, phrases, images, emojis, drawings, and the like.

As described herein, the term "domain specific language" includes any communicative language capable of conveying the intent of a user or user's on the configuration and operation of a network including, but not limited to, defining how components of the network are connected, establishing IP network ranges required in a cloud network and in other associated networks, such as an on premise network, establishing which applications running in an associated cloud network or in an on premise require access through a network, establishing redundant communication paths, setting preferred communication paths and backup communication paths, providing Internet access to or from, for example, cloud hosts, and setting what applications have access to the external networks, such as the Internet, which communication ports are used, etc.

Generally, a domain specific language may be considered a language used by computer based system that is specialized to a particular software application domain, which is in contrast to a general-purpose language, which is generally applicable across software domains. For example, there are a wide variety of domain specific languages, ranging from widely used languages for common domains, such as hypertext markup language (HTML) for web pages, through other types of languages used by only one or a few pieces of software.

In some implementations, domain specific languages may be subdivided by the kind of language such as domain-specific markup languages, domain-specific modeling languages (also referred to as "specification languages"), domain-specific programming languages, and the like. While special-purpose computer languages have been known since the advent of the computer age, the term "domain specific language" has become increasingly used due to the rise of domain-specific modeling. Other types of simpler domain specific languages, particularly domain specific languages used by a single application, are sometimes referred to as "mini-languages." However, in the context of the present disclosure, domain specific languages may be any language configured to express the intent of a user.

Production cloud network 204 may be any type of network computer system. In an implementation, production cloud network 204 may include a plurality of network objects, also referred to as nodes, such as database 120 and portal 210, connected in a communication network. In one implementation, production cloud network 204 may be in network communication with local networks 202 and external networks such as the Internet 212, with network operation configured, for example, using domain specific statements and rules which define the operational relationship between the local networks 202 and production cloud network 204.

Portal 210, in one implementation, may be configured to allow user access to statements, rules, and other configuration settings stored for example database 120, to convey, for example, in domain specific language, symbols, etc., relative to local networks 202 and production cloud network 204, communication paths, security protocols, and the like, between local networks 202 and production cloud network 204.

In this example, local networks 202 and production cloud network 204 may be connected via a plurality of network communication paths. For example, as illustrated, local networks 202 and production cloud network 204 may be connected via network communication paths 214, 216, 218, and 220. Production cloud network 204 may also be connected to other networks, such as the Internet 212 via network communication paths 222 and 224 as described further herein.

In an implementation, as illustrated in FIG. 2, statements, rules, and the like, may be used to convey a user intent to allow, deny, set redundancy, etc., of communication paths and access between components within and external to local networks 202, production cloud network 204, and other networks, such as the Internet 212. For example, rules may be established in a language, such as a domain specific language, that is configured to allow, deny, or set a redundancy of communication access between objects associated with local networks 202, such as cloud network 206 and cloud network 208 with objects, such as database 120 and portal 210, associated with production cloud network 204.

Referring to FIG. 2, and FIG. 3A, which illustrate example statements and rules establishing network configuration and communication policies, and FIG. 3B, which illustrates example rules establishing defining user intent for network connectivity and security, languages, such as domain specific language, may be employed to configure and validate networks according to the intent of one or more users. Such languages, may be expressive languages that are highly elaborated and generative, such as English, French, Spanish, etc. that can communicate and infinite number of ideas from a finite number of parts. In addition, such languages may be symbolic such as images, emojis, symbols, drawings, and/or may involve character based languages such as Japanese, Mandarin, etc., that may use combined character sets for human communication.

Referring to FIGS. 3A and 3B, domain specific language 300 may be configured such that a user intent to set network configuration parameters may be conveyed in multiple different forms. For example, domain specific language 300 may use phrases, statements, and words alone or in combination to convey user intent. In addition, domain specific language 300 may use other forms of communication such as codes, symbols, emojis, pictures, characters, drawings, and the like that are designed to convey such user intent.

In implementations, domain specific language 300 may also be used to vary the level of intent to allow a user to configure networks with one or more network configuration levels by employing differing levels of user intent. For example, a particular statement or rule may invoke a first level of intent, another statement or rule may provide another level of intent, a third statement or rule may be used to increase or decrease the intent level of other statements, rules, etc. and combinations of statements may be used to build an overall user intent. In some implementations, such domain specific language 300 may include an intent varying property, such as an additive or subtractive property, configured to increase or decrease the intent level of other statements, rules, etc. when combined therewith.

Referring to FIG. 2 and FIG. 3A, domain specific language 300 may include statements and rules such as statements 302, statements 304, and rules 306, configured to provide user intent to configure network parameters to, for example, name networks, set access permissions, establish network paths, define communication port use (also known herein as a "port"), and the like. For example, statements 302 may include a statement such as "Define ChicagoOnPremise as an external network with a CIDR of 10.20.0.0/16" which in this illustration may be designed to define, for example, cloud network 208 as an external network with a CIDR IP address of "10.20.0.0/16."

Statements 302 may also include statements such as "Define NewYorkOnPremise as an external network with a CIDR of 10.40.0.0/16" configured to set cloud network 208 as an external network with a CIDR IP address of 10.40.0.0/16, and may include other statements such as "Define OnPremiseNetworks as the union of ChicagoOnPremise and NewYorkOnPremise" to define both cloud networks 206 and 208 being grouped together as cloud network under local networks 202.

In implementations, domain specific language 300 may include statements 304 that may be used for other purposes, such as providing a naming convention. In one scenario, statements 304 may be configured to define alternative names associated with network resources. For example, statements 304 may include a statement such as "Define MyProductionCloud as a cloud network with an ID of XYZRANDOMUUID" in order to name production cloud network 204 with a name that may be fixed or chosen randomly.

In another example, statements 304 may include a statement such as "Define MyCloudDatabases as cloud hostclass with an ID of ANOTHERUUID" in order to, for example, identify database 120, as a cloud hostclass with an ID, or may include a statement such as "Define MyCloudWebPortal as cloud load balancer with an ID of LBUUID in order to label portal 210 as a cloud load balancer.

In implementations, domain specific language 300 may include rules 306 that may be employed to define user intent, connectivity, security, and the like. For example, domain specific language 300 may include rules 306 that define which network nodes can communicate, define which ports are used, define connections to databases, such as database 120, define the number of paths between each internal node of the network, define paths to external resources, and the like.

In one example, referring to FIGS. 2, 3A, and 3B, rules 306 may include rules that define the number of connections between local networks 202 and portal 210 and, and for example, the ports that may be used. For example, as illustrated in FIGS. 3A and 3B, rules 306 may include rule A 308 stipulating that "the OnPremiseNetworks hosts can connect via a Transmission Control Protocol (TCP) to MyCloudWebPortal on ports 80 and 443. Here, rule A 308 coveys the user intent to allow, for example, local networks 202 to connect to production cloud network 204 via TCP using two ports, e.g., port 80 and port 443.

In one implementation, a plurality of rules may be employed for example, to specify listening permissions, define traffic permission, establish connectivity security, etc. For example, referring to FIG. 3B, rule A 308 may define the configuration of network communication path 220 using domain specific language 300 stipulating rules such as "My cloud web portal hosts a VIP that listens on port 80 and port 443," which conveys the intent of the user to allow a user on portal 210 to access data on both port 80 and port 443, and rules such that "The security lists on the VIP allow traffic from 10.20.0.0/16 and 10.40.0.0/16," which convey the intent of the user providing the rule that the VIP can access communication packets from both IP address 10.20.0.0/16 and 10.40.0.0/16.

In addition, rule A 308 may include other domain specific language 300 stipulating rules such as "The IP for the OnPremiseNetworks is reachable via private IP Connectivity or IPSec from the MyCloudWebPortal, which in this example, allows data packets from production cloud network 204 may be reached via a private IP connection with the portal 210, and rules such as "The MyCloudWebPortal VIP is advertised to the OnPremiseNetworks either via private IP Connectivity or IPSec," which, in this example, makes the VIP visible from the portal 210 to local network 210.

Referring to FIG. 3B, rule B 310 may define the configuration of network communication path 218 using domain specific language 300 stipulating rules such as "MyCloudDatabases listens on port 22 and port 1151," which, in this example, allows the user to convey their intent to allow the database 120 to receive communication from specific ports associated with path 218, e.g., port 22 and port 1151, and a rule such as "The security lists on the MyCloudDatabases IP allow traffic from and 10.40.0.0/16," which in the context of this example, allows the user to convey their intent to configure the database 120 to allow communication on path 218 from a specific IP address, e.g., 10.40.0.0/16."

In addition, rule B 310 may include other domain specific language 300 stipulating rules such as "The IP for NewYorkOnPremise is reachable via private IP Connectivity or IPSec from the MyCloudDatabases," which, in the context of this example, allows a user to convey their intent to configure cloud network 206 such that communication between cloud network 206 and database 120 along path 218 is made via a private IP connection, and other rules such as "The MyCloudDatabases IP is advertised to the OnPremiseNetworks either via private IP Connectivity or Internet Protocol Security (IPSec)," which, in the context of this illustration, allows the user to convey their intent to configure communication between database 120 and local networks 202 making data on database 120 available to local networks 202 via a private IP connection.

Referring to FIG. 3B, rule C 312 may define the configuration of network communication path 222 using domain specific language 300 stipulating rules such as "Security Lists allow traffic from the Internet to the MyCloudWebPortal IP on ports 80 and 443," which, in view of this illustration, allows a user to convey user intent configuring communication between portal 210 and Internet 212 via a specified port, e.g., port 80, and rules such as "There is a public IP on MyCloudWebPortal that is advertised to the Internet," which under the context of this example, exposes an IP address of portal 210 to the Internet 212 for public access.

Referring to FIG. 3B, rule D 312 may define the configuration of network communication path 224 using domain specific language 300 stipulating rules such as "Security Lists prevent traffic from the Internet from reaching MyCloudDatabase," which here in this example, allows the user to convey their intent configuring communication to not allow access (i.e. deny access) to database 120 via Internet 212.

Referring to FIG. 3B, rule E 316 may define the configuration of network communication path 214 using domain specific language 300 stipulating rules such as "The ChicagoOnPremise cannot connect to MyCloudDatabases," which here in this example, such domain specific language 300 allows the user to convey their intent configuring communication between cloud network 206 and database 120 to deny communication via network communication path 214.

Referring to FIG. 3B, rule F 318 may define the configuration of network communication path 220 using domain specific language 300 stipulating rules such as "Check for at least two paths between networks," which here in this example, allows the user to convey their intent configuring a check on communication between local networks 202 and portal 210 to make sure that there at least two network communication paths therebetween.

Figure 4:
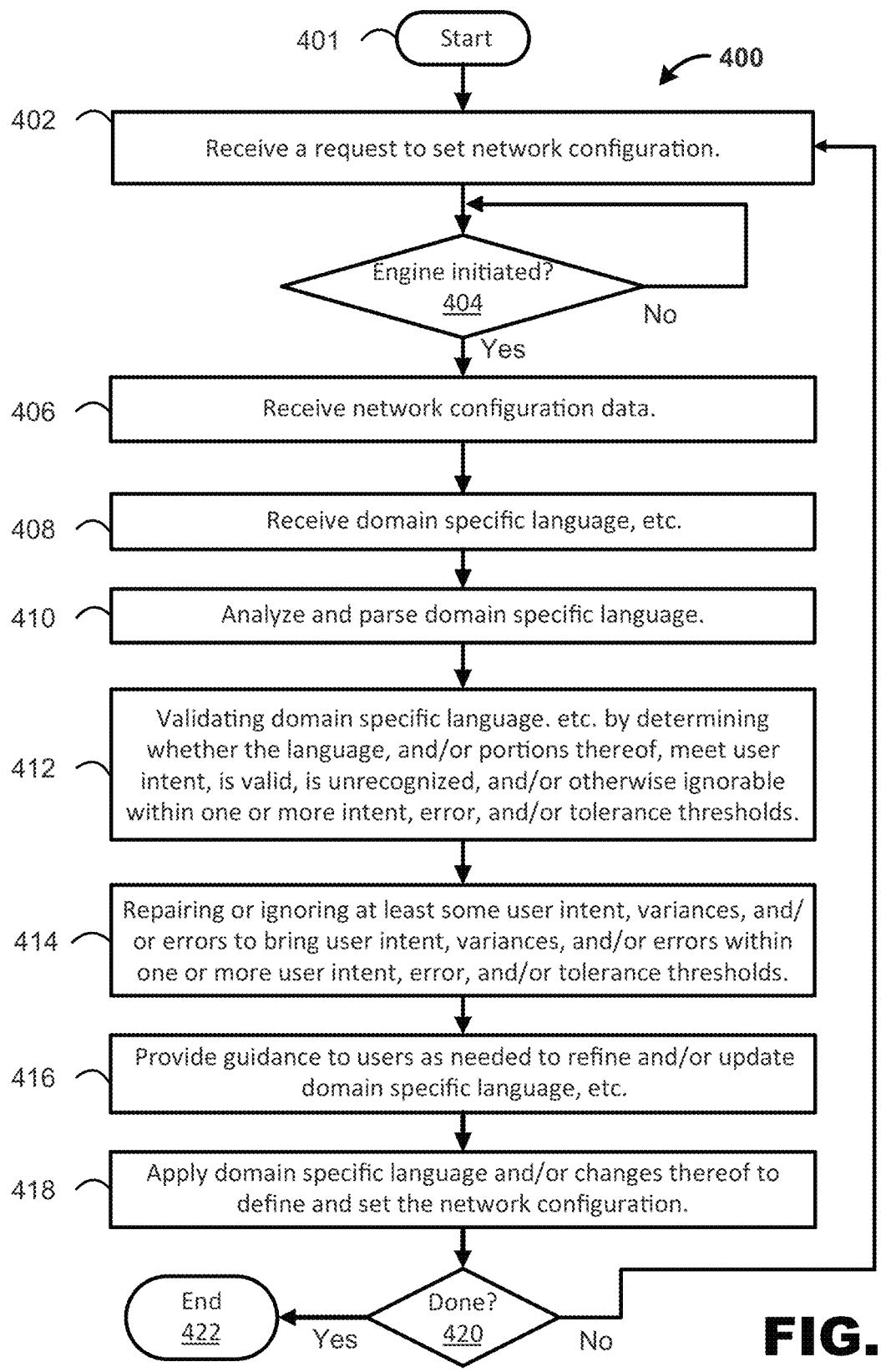
FIG. 4 is a high-level flow diagram illustrating a method of configuring and validating network based on user intent.

FIG. 4 is a high-level flow diagram illustrating a method 400 of configuring and validating network operations and configurations based on user intent. After initialization at 401, at 402, a system such as network validation system 110, may obtain user input from, for example, user input 114, or the like, providing a User Interface (UI), etc. for accepting input to configure and/or validate a network configuration based on user intent. At 404, method 400 determines whether an engine (e.g., process) to validate and/or configure a network, such as network validation engine 116, has been initiated. If so, method 400 proceeds to 406. If not, method 400 returns to 404.

At 406, method 400 receives configuration data pertaining to configuring a network, such as local networks 202, production cloud network 204, and associated network objects based on user intent. For example, method 400 may retrieve from database 120 data identifying available communication ports, data objects, etc. In addition, method 400 may receive other data associated with configuring a network such as types of domain specific language, symbols, and the like that may be used to configure the operation of the network based on the intent of a user. In other implementations, other data may be received by method 400 that relates to validating network configurations, error thresholds, user intent levels, and the like.

At 408, method 400 may receive data used to convey user intent to configure the operation of a network, such as domain specific language. In some implementations, domain specific language is received containing, for example, words, phrases, symbols, emojis, pictures, and the like configured to convey user intent on how a network is to be configured. For example, as described herein, domain specific language may contain statements, rules, etc. configured to convey user intent.

In other implementations, such words, phrases, symbols, emojis, pictures and the like may either individually or when combined may have visually or intrinsic properties that form and/or modify user intent (e.g. increase or decrease user intent). For example, emojis, such as a "thumbs up" emoji may have the property that expresses user intent of "OK," "correct," "good," etc. depending on the domain, culture, etc. where such emoji has a meaning. However, in other cultures, domains, etc., a "Thumbs up" emoji may invoke a different user intent. Moreover, such words, phrases, symbols, emojis, pictures and the like may either individually or when combined may include an intent varying property, such as an additive or subtractive property, configured to increase or decrease the intent level of other words, phrases, symbols, emojis, etc.

In some implementations, adding or subtracting such symbols, emojis, etc. may invoke differing levels of user intent that may be used to modify a language phrase, such as a language phrase formed in a domain specific language. As an example, in some cultures two "Thumbs Up" emojis may invoke the user intent of "even better." Thus, under a scenario where a user wants to emphatically stress that all ports of the network must be set to a particular security level relative to a number of expressive symbols, an exclamation symbol "!" may be used to invoke a first level of security, two exclamations "!!" may be used to stress user intent to at least employ a second level of security, and so on.

Alternatively, a user may employ other types of phases, such as "the network must be VERY secure" with a capitalized "VERY" to set a higher level of security than a lower case "very," "the network only requires limited security" to set a lower level of security, "the network must always be secure" to set a high level of security, and the like. In other scenarios, the way symbols are conveyed may be used to impart differing meanings to instructions. For example, phases such as "NO ACCESS," "No Access!," "NO access," No Access plus (frown emoji, stop sign image, etc.)," may be used to change a level of user intent. Thus, combinations of symbols, words, phrases, images, emojis, and the like, may be combined to express and impart differing levels of user intent to network configuration instructions.

At 410, method 400 analyzes and parses data used convey user intent to configure the operation of a network. For example, method 400 may analyze and parse domain specific statements and rules as described herein used to configure one or more networks. In some implementation, method 400 analyzes all or a portion of the domain specific language to determine a user intent. For example, consider the scenario where domain specific language contains the phrase "always deny communication on network path . . . ." Under this scenario, method 400 may identify the words "always deny" to mean to always not allow, always refuse, etc. However, in other scenarios, phrases such as "randomly deny," "deny X packets and allow Y packets", "allow every third communication, "delay communication," "may deny," and the like, may provide variability in user intent.

In other implementations, method 400 may analyze domain specific language to determine language, symbols, emojis, and the like, may be used to increase or decrease the level of user intent. For example, under a scenario where a first set of domain specific language is used to always allow access to a VIP, a second set of domain specific language may be used to modify the first set such to vary the level of intent specified by the first set. As an example, the second set of domain specific language may add the provision to change the meaning of "always" to "always except" when the VIP is traveling in a particular area. Thus, certain domain specific language may be used to modify user intent associated with other domain specific language.

At 412, method 400 may be configured to validating domain specific language by determining whether domain specific language, and portions thereof, meet user intent, is valid, is unrecognized, and/or otherwise ignorable within one or more intent, error, and/or tolerance thresholds. For example, method 400 may be configured to accept some threshold level of user intent, to accept some level of errors such as spelling errors, differing font types, missing characters, and the like, ignore some level of unrecognized content (e.g., a programming note), tolerate some level of unrecognized data (e.g., a "$" in a word used as a place holder), and the like, relative to one or more thresholds.

In other implementations, method 400 may be configured to determining whether variances and errors of domain specific language are valid, unrecognized, and/or otherwise ignorable within one or more tolerance thresholds. For example, method 400 may be configured to tolerate and adjust to some level of system issues such as processor speed, processor efficiency, latency, etc. relative to process such domain specific language.

In some scenarios, method 400 may be configured to allow the processing of domain specific language relative to one or more tolerance thresholds. For example, due to processor performance, some tradeoff between processing speed and processing time may be established to allow domain specific language to tolerate differing levels of processing when processed on devices having differing levels of processing power and efficiency.

At 414, method 400 may be configured to repair and/or ignore at least some user intent, variances, and/or errors to bring the user intent, variances, and errors within one or more user intent, error, and/or tolerance thresholds. For example, method 400 may be configured to detect user intent level errors, detect variances in areas such as processing speed and efficiency, IP address issues, etc., detect errors in the domain specific language, such as spelling errors, language syntax errors, and the like.

In one implementation, method 400 may be configured to repair user intent level, for example, by changing domain specific language, or portions thereof, in order to decrease or increase user intent relative to a user intent level threshold. For example, in one scenario, a user intent level may be set to different user intent levels such as "specific user intent," "variable user intent," "strict user intent," "soft user intent," and the like. Method 400 may determine that a network is configured using domain specific language with the user intent that the network "must adhere" to a strict level of user intent and repair and or modify domain specific language to bring the domain specific language used to configure the network to the "strict level" of user intent. As such, method 400 may validate and repair domain specific language that does not meet a particular level of user intent.

In other implementations, method 400 may be configured to detect and/or repair variances in domain specific language in order to maintain the domain specific language within a variance threshold. As such, in one scenario, method 40 may be configured to detect domain specific language that varies in a manner that may vary or cause confusion as to what the user intent is. For example, method 400 may be configured to detect when two domain specific languages conflict relative to a user intent, such as in the case for communication to the same IP address where one portion of the domain specific language stipulates "may communicate" to the IP address which directly conflicts with another portion of the domain specific language that stipulates "may not communicate" to the same IP address.

In one implementation, method 400 may be configured to detect, repair, and/or ignore errors in domain specific language used to configure a network. For example, method 400 may be configured to detect spelling errors, syntax errors, and other errors within the domain specific language to bring domain specific language within some error threshold. As such, in some scenarios, method 400 may determine that some errors with domain specific language must be repaired, may be repaired, or may be ignored within a particular threshold or set of thresholds. In an implementation, configuring method 400 to repair or ignore errors associated with domain specific language allows method 400 to establish a tolerance level or levels of such errors.

At 416, method 400 may be configured to provide guidance to users as needed to refine and/or update domain specific language. For example, consider a scenario where domain specific language includes redundant language that may decrease processor efficiency. Under this scenario, method 400 may provide guidance to a user to remove such redundant language. In other scenarios, method 400 may be configured to detect when domain specific language violates a particular policy, method 400 may be configured to provide guidance to a user on how to repair such violation.

In other implementations, method 400 may be configured to provide user monitoring and alerting data when, for example, user intent levels are violated, network communication connections fail, policies are not adhered to, security is breached, changes are made to domain specific language, rules are broken, and the like.

In one implementation where domain specific language provides rules, method 400 may be configured to protect the user from performing actions that would violate such rules. Under such scenario, for example, if a user tried to delete an ipsec connection which would violate a redundancy rule, e.g., where a network object would lose redundant connectivity, the user may be warned that the action is not permitted. In this scenario, method 400 may be configured to provide the user with a way to resolve the warning such as overriding the warning, modifying the rule, etc. Additionally, there may be permission levels defined for different users that would only allow users with certain permissions the ability to make changes that would violate a rule.

At 418, method 400 may apply domain specific language, and/or changes thereof to define and set or reset the network configuration. For example, method 400 may be configured to apply a set or sets of domain specific language to set the configuration of a network or networks based on user intent conveyed by such domain specific language. In addition, method 400 may be configured to implement changes to the network and/or domain specific language, for example, to repair errors, resolve user intent variations, and the like.

At 420, method 400 determines whether the validation and/or application of domain specific language or changes thereto are finished. If not, method 400 proceeds to 402. If so, method 400 proceeds to 422 and ends.

Figure 5:
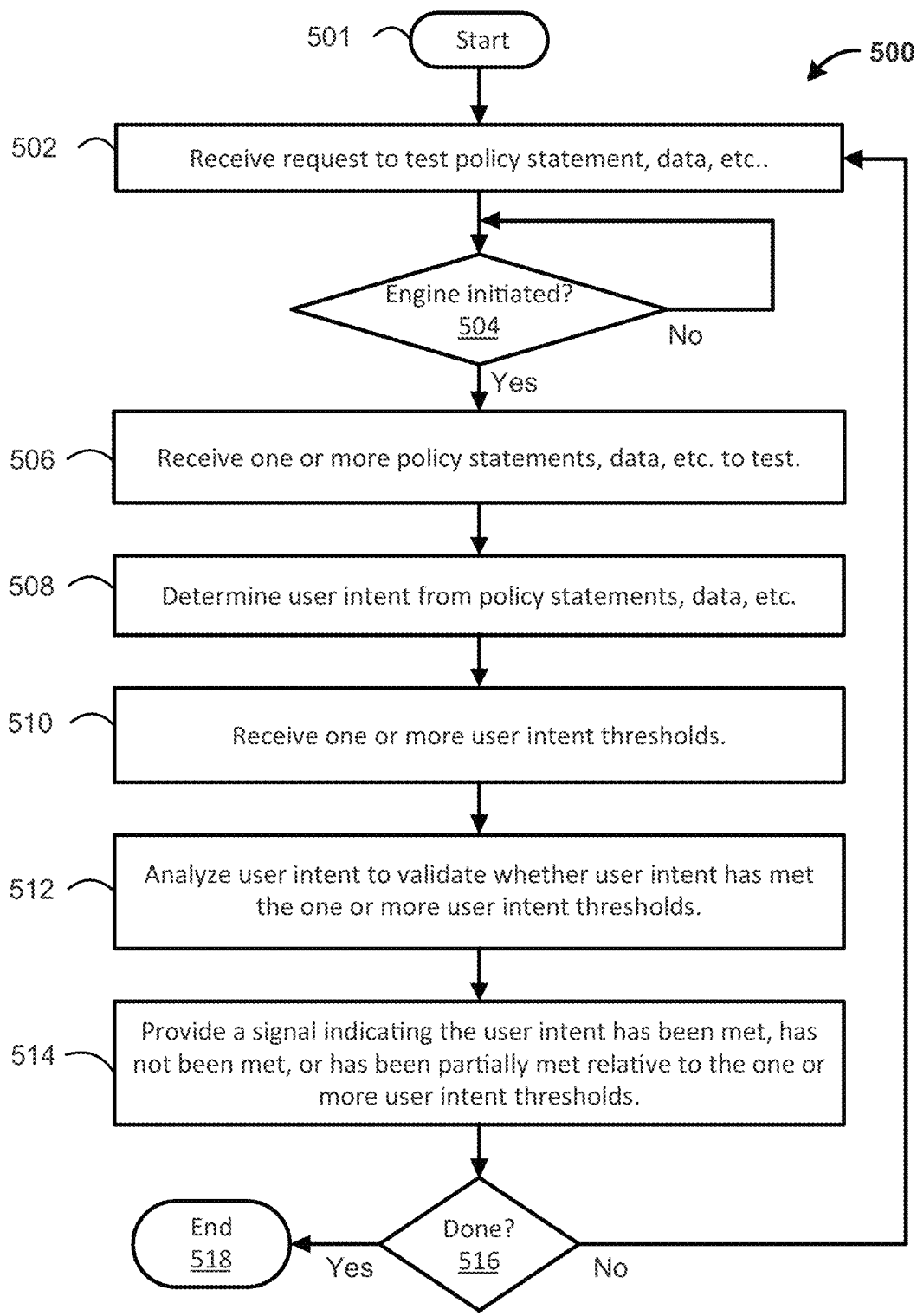
FIG. 5 is a high-level flow diagram illustrating a method of determining user intent based on analyzing data such as policy statements, rules, symbols, emojis, drawings, etc.

FIG. 5 is a high-level flow diagram illustrating a method 500 of determining and validating user intent based on analyzing data such as policy statements, rules, symbols, emojis, images, etc. After initialization at 501, at 502, a system such as network validation system 110, may obtain user input from, for example, user input 114, or the like, providing a UI, etc. for accepting input to determine user intent based on, for example, analyzing domain specific language conveying policy statements, rules, etc. At 504, method 500 determines whether an engine (e.g., process) to analyze user intent conveying language (e.g., domain specific language), such as network validation engine 116, has been initiated. If so, method 500 proceeds to 506. If not, method 500 returns to 504.

At 506, method 500 receives one or more policy statements, data, etc., to test. For example, a policy statement, rule, etc., may be provided using domains specific language configured to convey user intent pertaining to configuring and/or validating the configuration and/or operation of one or more networks.

At 508, method 500 determines user intent of one or more policy statements, data, etc. In one implementation, method 500 may parse and analyze words, symbols, emojis, and the like, to determine user intent. For example, method 500 may analyze a set of domain specific language 300, as described above, providing statements and rules used to convey user intent toward configuring and/or validating network configurations and operation.

In other implementations, method 500 may use a plurality of methods to determine user intent. For example, method 500 may count the number of repeated words, symbols, etc." that would develop, generate, or define a level of user intent. In some scenarios, method 500 may be configured to read phases, symbols, etc. in context that based on the context of the phrase, may establish user intent.

At 510, method 500 receives one or more user intent thresholds. In one implementation, for example, method 500 may receive a user intent threshold to set each communication path of a network to a particular security level. In other examples, method 500 may receive a plurality of user intent thresholds to allow the user to set multiple different levels of user intent. For example, a user may set one level of intent to secure the network at a first level of security, and set another level of intent to set particular network communication paths to another level of security.

At 512, method 500 analyzes user intent to validate whether user intent has met the one or more user intent thresholds. In implementations, method 500 may determine that user intent has met one or more user intent thresholds by determining a level of user intent to convey a network configuration and compare that to the one or more user intent thresholds. In some scenarios, user intent may be found by determining an intent score that associates a level of user intent to, for example, a particular numerical score.

At 514, method 500 provides a signal (e.g., telemetry) indicating the user intent has been met, has not been met, or has been partially met relative to the one or more user intent thresholds. For example, a signal such as a UI indicator may be provided to a user thereof.

At 516, method 500 determines whether determining user intent has finished. If not, method 500 proceeds to 502. If so, method 500 proceeds to 518 and ends.

Although the description has been described with respect to particular embodiments thereof, these particular embodiments are merely illustrative, and not restrictive.

Figure 6:
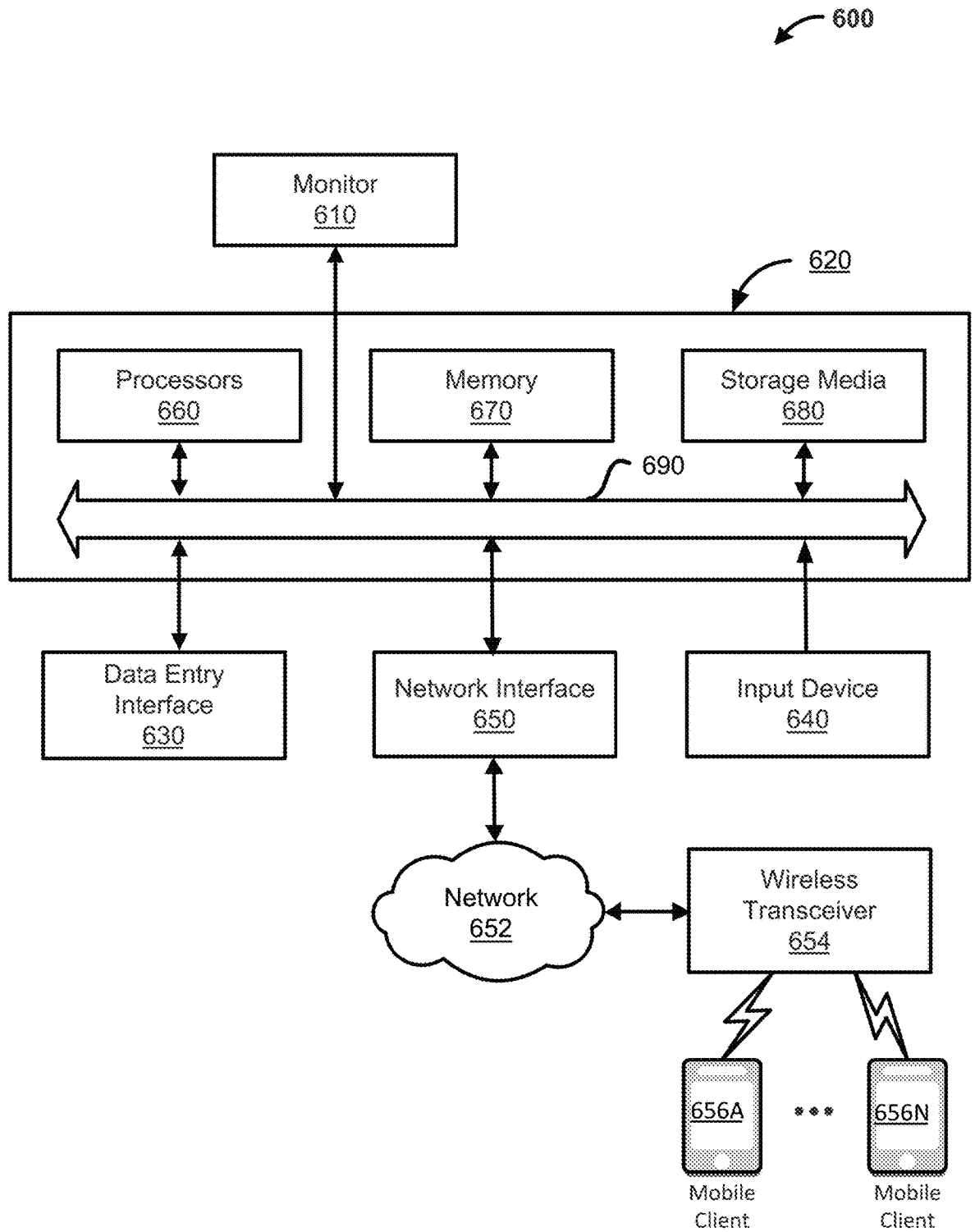
FIG. 6 is a high-level block diagram of an exemplary computer and communication system.

FIG. 6 is a block diagram of an exemplary computer system 600 for use with implementations described herein. Computer system 600 is merely illustrative and not intended to limit the scope of the claims. One of ordinary skill in the art would recognize other variations, modifications, and alternatives. For example, computer system 600 may be implemented in a distributed client-server configuration having one or more client devices in communication with one or more server systems.

In one exemplary implementation, computer system 600 includes a display device such as a monitor 610, computer 620, a data entry device 630 such as a keyboard, touch device, and the like, a user input device 640, a network communication interface 650, and the like. User input device 640 is typically embodied as a computer mouse, a trackball, a track pad, wireless remote, tablet, touch screen, and the like. Moreover, user input device 640 typically allows a user to select and operate objects, icons, text, characters, and the like that appear, for example, on the monitor 610.

Network interface 650 typically includes an Ethernet card, a modem (telephone, satellite, cable, ISDN), (asynchronous) digital subscriber line (DSL) unit, and the like. Further, network interface 650 may be physically integrated on the motherboard of computer 620, may be a software program, such as soft DSL, or the like.

Computer system 600 may also include software that enables communications over communication network 652 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 652 may include a local area network, a wide area network, a wireless network, an Intranet, the Internet, a private network, a public network, a switched network, or any other suitable communication network, such as for example Cloud networks. Communication network 652 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 652 may communicate to one or more mobile wireless devices 656A-N, such as mobile phones, tablets, and the like, via a base station such as wireless transceiver 654.

Computer 620 typically includes familiar computer components such as a processor 660, and memory storage devices, such as a memory 670, e.g., random access memory (RAM), storage media 680, and system bus 690 interconnecting the above components. In one embodiment, computer 620 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 670 and Storage media 680 are examples of tangible non-transitory computer readable media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:

receiving a language phrase configured to impart operational instructions expressing user intent on configuring and operating a network, wherein the language phrase includes one or more symbols having an appearance that reflects a portion of the user intent, wherein the one or more symbols comprise at least one of:

an additive property configured to increase a level of the user intent associated with the portion of the language phrase, or a subtractive property configured to decrease the level of the user intent associated with the portion of the language phrase;

parsing the language phrase to identify that the portion of the language phrase conveys both the operational instructions and the user intent associated with the configuring and the operating of the network;

analyzing the portion of the language phrase to determine the level of the user intent resulting from the inclusion of the one or more symbols;

validating that the portion of the language phrase meets a threshold level of the user intent; and in response to the portion of the language phrase meeting the threshold level of the user intent, providing access to the portion of the language phrase in order to configure and operate the network according to the user intent.

2. The non-transitory computer readable medium of claim 1, wherein the language phrase comprises domain specific language.

3. The non-transitory computer readable medium of claim 1, wherein the symbols comprise a property configured to modify the user intent.

4. The non-transitory computer readable medium of claim 1, wherein the symbols comprise emojis conveying at least a portion of the user intent.

5. The non-transitory computer readable medium of claim 1, wherein the language phrase comprises a subset of expressive language that taken in context of a domain specific to the network expresses the user intent.

6. The non-transitory computer readable medium of claim 1, further comprising receiving another subset of language configured to modify the level of the user intent associated with at least the portion of the language phrase.

7. The non-transitory computer readable medium of claim 1, further comprising after applying the language phrase to the network, validating that configuration and operation of the network comply with the user intent.

8. A computer implemented method, comprising:
receiving a language phrase configured to impart operational instructions expressing user intent on configuring and operating a network, wherein the language phrase includes one or more symbols having an appearance that reflects a portion of the user intent, wherein the one or more symbols comprise at least one of:
an additive property configured to increase a level of the user intent associated with the portion of the language phrase, or
a subtractive property configured to decrease the level of the user intent associated with the portion of the language phrase;
parsing the language phrase to identify that the portion of the language phrase that conveys both the operational instructions and the user intent associated with the configuring and the operating of the network;
analyzing the portion of the language phrase to determine the level of the user intent resulting from the inclusion of the one or more symbols;
validating that the portion of the language phrase meets a threshold level of the user intent; and
in response to the portion of the language phrase meeting the threshold level of the user intent, providing access to the portion of the language phrase in order to configure and operate the network according to the user intent.

9. The method of claim 8, wherein the language phrase comprises domain specific language.

10. The method of claim 8, wherein the symbols comprise a property configured to modify the user intent.

11. The method of claim 8, wherein the symbols comprise emojis conveying at least a portion of the user intent.

12. The method of claim 8, wherein the language phrase comprises a subset of expressive language that taken in context of a domain specific to the network expresses the user intent.

13. The method of claim 8, further comprising receiving another subset of language configured to modify the level of the user intent associated with at least the portion of the language phrase.

14. An apparatus for configuring and validating computer networks in a computing environment, the computing environment comprising one or more computing devices in communication with a utility that executes a process configured to process language used to convey a user intent for a network configuration accessible to the one or more computing devices, a computing device of the one or more computing devices configured to:
receiving a language phrase configured to impart operational instructions expressing user intent on configuring and operating a network, wherein the language phrase includes one or more symbols having an appearance that reflects a portion of the user intent, wherein the one or more symbols comprise at least one of:
an additive property configured to increase a level of the user intent associated with the portion of the language phrase, or
a subtractive property configured to decrease the level of the user intent associated with the portion of the language phrase;
parsing the language phrase to identify that the portion of the language phrase that conveys both the operational instructions and the user intent associated with the configuring and the operating of the network;
analyzing the portion of the language phrase to determine the level of the user intent resulting from the inclusion of the one or more symbols;
validating that the portion of the language phrase meets a threshold level of the user intent; and
in response to the portion of the language phrase meeting the threshold level of the user intent, providing access to the portion of the language phrase in order to configure and operate the network according to the user intent.

* * * * *